United States Patent
Boarino et al.

(10) Patent No.: US 11,592,289 B2
(45) Date of Patent: Feb. 28, 2023

(54) REFERENCE-STANDARD DEVICE FOR CALIBRATION OF MEASUREMENTS OF LENGTH, AND CORRESPONDING CALIBRATION PROCESS

(71) Applicant: Istituto Nazionale di Ricerca Metrologica, Turin (IT)

(72) Inventors: Luca Boarino, Turin (IT); Federico Ferrarese Lupi, Turin (IT); Giulia Aprile, Turin (IT); Natascia De Leo, Turin (IT); Michele Perego, Turin (IT); Michele Laus, Turin (IT); Giampaolo Zuccheri, Turin (IT); Gabriele Seguini, Turin (IT)

(73) Assignee: Istituto Nazionale di Ricerca Metrologica, Turin (IT)

( * ) Notice: Subject to any disclaimer, the term of this patent is extended or adjusted under 35 U.S.C. 154(b) by 945 days.

(21) Appl. No.: 16/304,216

(22) PCT Filed: May 19, 2017

(86) PCT No.: PCT/IB2017/052957
§ 371 (c)(1),
(2) Date: Nov. 23, 2018

(87) PCT Pub. No.: WO2017/203406
PCT Pub. Date: Nov. 30, 2017

(65) Prior Publication Data
US 2020/0318957 A1    Oct. 8, 2020

(30) Foreign Application Priority Data

May 23, 2016 (IT) ................ 102016000052889

(51) Int. Cl.
*G01B 21/04* (2006.01)
*B82Y 35/00* (2011.01)
(Continued)

(52) U.S. Cl.
CPC ........... *G01B 21/042* (2013.01); *B82Y 35/00* (2013.01); *B82Y 40/00* (2013.01); *G01B 21/045* (2013.01); *G01Q 40/02* (2013.01)

(58) Field of Classification Search
CPC ...... G01B 21/042; G01B 1/045; B82Y 35/00; B82Y 40/00; G01Q 40/02
See application file for complete search history.

(56) References Cited

U.S. PATENT DOCUMENTS

| 2008/0121791 | A1* | 5/2008 | Nakayama | ............ H01J 37/28 250/311 |
| 2014/0197133 | A1* | 7/2014 | Montarnal | ............ G03F 7/11 524/320 |

FOREIGN PATENT DOCUMENTS

| CN | 103 278 662 | 9/2013 |
| JP | 8-285502 | 11/1996 |

OTHER PUBLICATIONS

International Search Report and Written Opinion of the ISA for PCT/IB2017/052957, dated Aug. 21, 2017, 15 pages.
(Continued)

*Primary Examiner* — Nicole M Ippolito
(74) *Attorney, Agent, or Firm* — Nixon & Vanderhye P.C.

(57) ABSTRACT

A reference-standard device (20) for calibration of measurements of length, comprising a substrate (10) that includes a surface (10a) having at least one calibration pattern (11). According to the invention, this pattern comprises a plurality of nanometric structures (14), said nanometric structures (14) having one and the same section in the plane of said surface and having the same nanometric dimensions, in particular less than 50 nm, said nanometric structures (14) being arranged at a distance from one another by a constant pitch of nanometric length, in particular less than 50 nm, in at least one direction, said nanometric structures (14) being arranged within spatial regions (12) delimited in one or more
(Continued)

directions in the plane of the substrate (10), said nanometric structures (14) being obtained via application to said substrate (10) of a process of nanostructuring (100) by means of a mask of block copolymers in order to make calibrations of measurements of length of the order of nanometres.

15 Claims, 6 Drawing Sheets

(51) Int. Cl.
*B82Y 40/00* (2011.01)
*G01Q 40/02* (2010.01)

(56) References Cited

OTHER PUBLICATIONS

Haycocks J et al., "Use of transfer 13, 17-22 standards for the calibration of scanning probe microscope scales: a case study", Proceedings of the 3rd Seminar on Quantitative Microscopy. Geometrical Measurements in the Micro- and Novometre Range With Far and Near Field Methods (Ptb-F-34) Phys-Tech Bundesanstalt Braunschwelg Und Berlin, 1998, pp. 97-102.

* cited by examiner

REFERENCE-STANDARD DEVICE FOR CALIBRATION OF MEASUREMENTS OF LENGTH, AND CORRESPONDING CALIBRATION PROCESS

This application is the U.S. national phase of International Application No. PCT/IB2017/052957 filed 19 May 2017, which designated the U.S. and claims priority to IT Patent Application No. 102016000052889 filed 23 May 2016, the entire contents of each of which are hereby incorporated by reference.

TECHNICAL FIELD

The present disclosure relates to a reference-standard device for calibration of measurements of length, which comprises a substrate including a surface having at least one calibration pattern.

The invention has been developed with particular attention paid to its possible application in microscopic-measurement techniques, such as AFM (Atomic-Force Microscope) or TERS (Tip-Enhanced Raman Spectroscopy) measurements.

For simplicity of illustration, in the sequel of the present description practically constant reference will be made to this possible sphere of application. It will be appreciated, on the other hand, that the scope of the invention is altogether general and is hence not limited to this specific context of application.

Various embodiments may be applied also to techniques for determination of the average size of the grains of a polycrystalline material in x-ray spectroscopy techniques, such as GISAXS (Grating-Incidence Small-Angle X-ray Scattering), XRR (X-Ray Reflectivity), etc., or in electron-microscopy techniques, such as SEM (Scanning Electron Microscopy) or SPM (Scanning Probe Microscopy), over a wide area, or to applications of super-resolution optical microscopy for biological imaging.

TECHNOLOGICAL BACKGROUND

Standards of submicrometric lateral lengths, in particular of the order of nanometres, are necessary for calibrating a series of instruments that range from scanning electron microscopes and transmission electron microscopes to atomic-force microscopes, tunneling electron microscopes, and all spectroscopy systems by now equipped with FTIR (Fourier-Transform InfraRed), Raman, and SIMS (Secondary-Ion Mass Spectrometry) microscopes, and others still.

The known technologies for providing reference-standard devices for calibration of measurements of length, in particular standards of length of submicrometric dimensions, are typically borrowed from microelectronics. By means of these technologies there have in the past been obtained standards of length based upon optical and electron lithography and liquid or gas chemical etching of silicon by using silicon-oxide masks. These standards do not extend below 100-70 nm, present a low level of uncertainty, but below these dimensions electron-lithography methods do not enable production of large amounts of periodic nanostructures, given the sequentiality of writing. Consequently, the uncertainties of the measurements on these structures are high and not suited to a reference standard.

In order to carry out a national length standard referred or traceable to the nanoscale is further necessary to be able to apply with reduced costs and in a practical manner the traceability chain with respect to the standard length measurement unit of the of the International System of Units (SI), the meter. Such traceability can be obtained by different methods, among which the Michelson interferometer, the use of microscopes already traceable, or through X ray techniques (e.g. GISAX) in metrological synchrotron facilities, where all the detectors are traceable to the SI.

Currently, the nano-scale lateral length standards are based upon diffraction gratings made of silicon with a periodicity of the order of hundreds of nanometres or on crystals the lattice pitch of which is sub-nanometric. Between these two extremes there do not exist commercial standards, and the use of these two types of reference standards is inconvenient and imprecise for the majority of instruments.

For instance, in the field of carbon nanotubes or nanoparticles, there are today required step-height measurements of less than 3 nm. The best standard of such type commercially available today is 6 nm with an uncertainty of between 0.5 and 1 nm. As regards the lateral dimensions, instead, the smallest commercial standards are 25 nm or 70 nm, like the ones produced by VLSI (http://www.vlsistandards.com/products/dimensional/nano cd.asp?sid=83), which envisage the use of a chip or substrate of amorphous silicon that comprises a single isolated line. The accuracies on the periodicity of lateral lengths depend upon the number of structures manufactured in the standard. For example, with electron lithography (below a micron or hundreds of nanometres), high numbers of periodic structures are obtained, which are commensurate with the writing times, typical of a sequential process.

OBJECT AND SUMMARY

The object of the embodiments described herein is to improve the potential of the techniques according to the known art, as discussed previously.

Various embodiments achieve this object thanks to a reference-standard device having the characteristics recalled in the ensuing claims. Various embodiments may also refer to corresponding calibration processes, as likewise to a method for manufacturing a reference-standard device.

The claims form an integral part of the technical teachings provided herein in relation to the invention.

BRIEF DESCRIPTION OF THE DRAWINGS

Various embodiments will now be described, purely by way of example, with reference to the annexed drawings, in which.

DETAILED DESCRIPTION

In the ensuing description numerous specific details are provided in order to enable maximum understanding of the embodiments, which are provided by way of example. The embodiments may be implemented with or without specific details, or else with other methods, components, materials, etc. In other circumstances, well-known structures, materials, or operations are not illustrated or described in detail so that various aspects of the embodiments will not be obscured. Reference in the course of the present description to "an embodiment" or "one embodiment" is meant to indicate that a particular feature, structure, or characteristic described in connection with the embodiment is comprised in at least one embodiment. Hence, phrases such as "in an embodiment" or "in one embodiment" or the like that may appear in various points of the present description do not necessarily refer to one and the same embodiment. Furthermore, the particular features, structures, or characteristics may be combined in any convenient way in one or more embodiments.

The references used herein are provided merely for convenience of the reader and do not define the scope or meaning of the embodiments.

In brief, the present invention envisages providing a reference-standard device, in particular with respect to the length unit of the International System, having a surface with at least one calibration pattern, preferably a calibration pattern extending over a large area and a calibration patterna over a smaller area where this pattern comprises a plurality of nanometric structures, preferably cylindrical, having one and the same section in the plane of said surface and having the same nanometric dimensions, in particular less than 50 nm, the nanometric structures being arranged at a distance from one another by a constant pitch of nanometric length, in particular less than 100 or 50 nm, in at least one direction, the nanometric structures being arranged within spatial regions delimited in one or more directions in the plane of the substrate. The nanometric structures are obtained via application to said substrate of a process of nanostructuring by means of a mask of block copolymers in order to make calibrations of measurements of length of the order of nanometres.

The manufacturing method using block copolymers alows obtaining nanometric structures in parallel, on a same device, both over a large area and inside delimited areas.

The aforesaid mask may be kept applied to the surface or else may be used for propagating the pattern of nanometric structures to the substrate.

Figure 1:
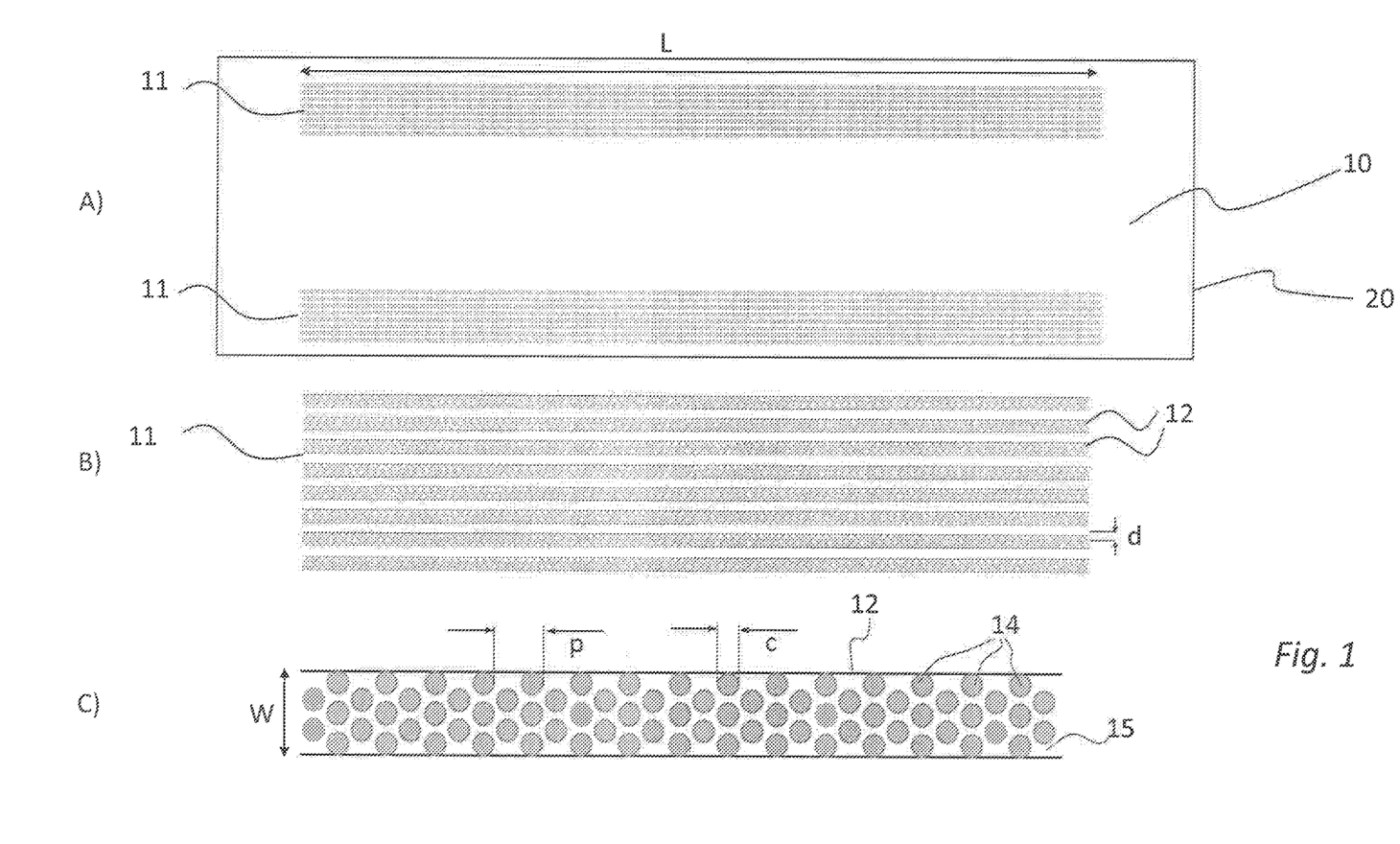
FIGS. 1A-1C show three top plan views with different degrees of enlargement of a reference-standard device forming the subject of the present description.

FIGS. 1A-1C show three top plan views with different degrees of enlargement of a reference-standard device 20 forming the subject of the present description. FIG. 1A shows the standard device 20, FIG. 1B is an enlargement that shows a calibration pattern 11 thereof, and FIG. 1C is a further enlargement that shows spatial regions 12 in the calibration pattern 11.

Illustrated schematically in top plan view in FIG. 1A is a reference-standard device 20 for calibration of measurements of length, which comprises a substrate 10, made, for example, of silicon oxide ($SiO_2$). On a surface 10a of the substrate 10, in the figure the top surface, two calibration patterns 11 are present, which are rectangular in shape and have a length L of approximately 100 μm. Each of these calibration patterns 11 comprises a plurality of spatial regions 12, in the example eight spatial regions 12, which are rectangular in shape, are arranged parallel to one another, have a length L and a width W, and are spaced apart by a distance d. These spatial regions 12 correspond to trenches 12 dug in the silicon of the substrate 10 for a depth t. Each spatial region 12 comprises a plurality of nanometric structures 14 that have one and the same cross section in the plane of the surface 10a. In particular, in the example of FIGS. 1A-1C, the nanometric structures 14 are cylindrical in shape; i.e., they have a circular cross section in the plane of the surface 10a. Such cylindric morphology has the advantage, with respect to a lamellar morphology, of minimizing the error itroduce by the convolution of the tip of the SPM microscope with the nanostructure, and to supply during the scan along the lateral axes, a cuspidal trend in correspondence with the cylinders, allowing a direct and quick measure of the period. The nanometric structures 14 have the same nanometric dimensions; in the example illustrated, they have one and the same diameter c. In the present description by "nanometric dimensions" are meant dimensions less than 100 nm, preferably less than 50 nm.

Thus nanometric structures 14 have the same nanometric dimensions, i.e. smaller than 100 nanometers, in the case of cylindrical structures, the nanometric dimensions are reduced to the diameter c, which is less than 100 nanometers, in the case of structures such as rectangular section lamellae, the same nanometric dimensions means that the two largest and smaller dimensions are below 100 nanometers. The nanometric structures 14 are arranged at a distance from one another by a constant pitch p of nanometric length in the longitudinal direction of the rectangles identified by the spatial regions 12. This pitch p, which is measured, in the example, between the corresponding edges of two nanometric structures 14, but may also be measured between their centres, is for example 27 nm (see the microphotograph of FIG. 5). The dimension c of the nanometric structures 14 is less than the pitch p (in a way depending upon the molecular weight of the polymers used, it falls between 12 and 40 nm). Hence, the nanometric structures 14 are arranged within spatial regions 12, which are delimited in one or more directions in the plane of the substrate 10; in this case, they are limited in the direction of the width W of the spatial regions 12, which in the example is 300 nm. These nanometric structures 14, according to a main aspect of the solution described herein, are obtained via application to the substrate 10 of a nanostructuring process 100, described in what follows with reference to FIGS. 3 and 4, by means of a mask 16 of block copolymers, in order to make calibrations of measurements of length of the order of nanometres, preferably for lengths less than 50 nm.

Figure 2:
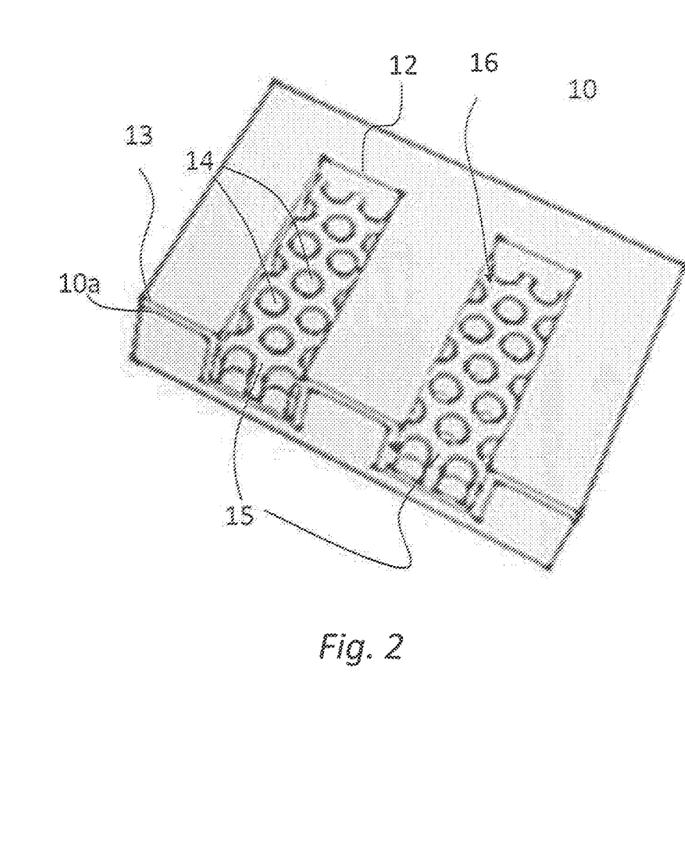
FIG. 2 shows a perspective view of the device of FIGS. 1A-1C.

FIG. 2 is a schematic perspective view, sectioned in a plane along the width W, of a reference-standard device 20, where the polymeric mask 16 may be seen as being made up of empty cylindrical nanometric structures 14 in a matrix 15. The mask 16 in general comprises, initially, as described more fully in what follows, nanometric structures 14 of a first polymeric phase, for example PMMA, in a matrix 15 of a second polymeric phase, for example polystyrene. In actual fact, in FIG. 2 the first polymeric phase of the nanometric structures 14 has been removed via acid etching to leave hollow cylinders in the matrix 15.

As described in greater detail in what follows, the nanostructures 14 on the substrate 10 may be obtained by means of the mask 16 of block copolymers, in which one of the two phases, the first polymeric phase of the nanostructures 14 or the second polymeric phase of the matrix 15, is removed. Preferably, however, propagation of the mask 16 to the substrate 10 is envisaged by means of gas chemical processes (for example, RIE—Reactive Ion Etching). Using the mask 16 as lithographic mask, there are hence for example obtained nanostructures 14 either in the form of cylindrical holes in the substrate 10, via removal of the first phase and of the underlying substrate, or in the form of cylindrical columns made of the same material as that of the substrate, Si or $SiO_2$, via removal of the second phase of the matrix 15 and of the underlying substrate. Of course, in either case also the remaining part of polymeric mask 16 is eventually removed so that only the nanostructured substrate 10 remains.

Hence, it is clear that the nanostructures 14 may be cavities in a matrix of column structures (with circular cross section, but even with other sections, for example, in lamellar form with a substantially rectangular cross section). In other words, these nanometric structures 14 belong to the substrate 10 or to the mask 16 and comprise cavities and/or reliefs of the mask 16 or of the substrate 10.

Figure 3:
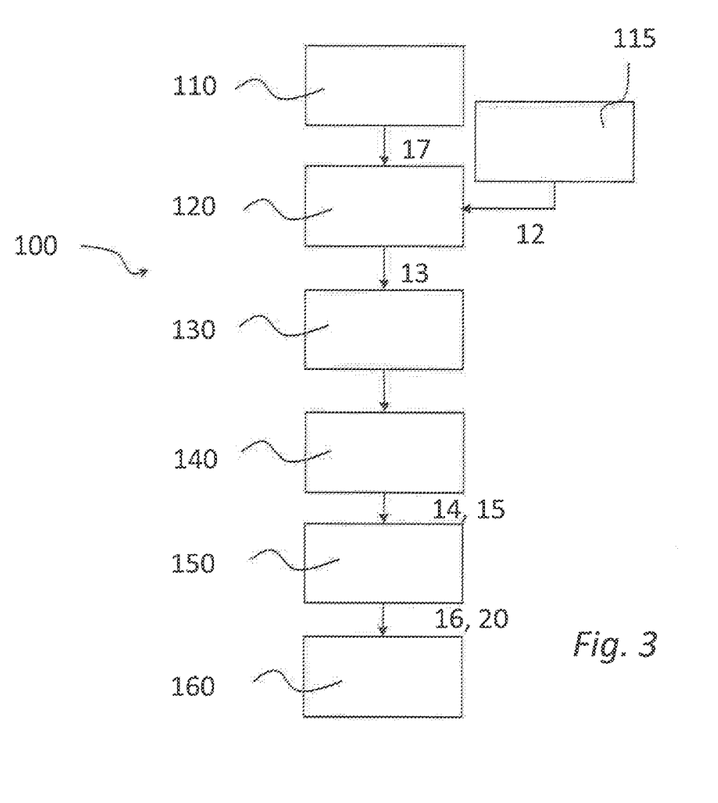
FIG. 3 shows a flowchart, provided by way of example, of a method for manufacturing the device of FIGS. 1A-1C.

FIG. 3 is a flowchart illustrating a nanostructuring process 100 used by the invention.

In a step 110, it is envisaged to introduce block copolymers comprising a first polymeric phase or first block, for example PMMA, and a second polymeric phase, or second block, for example polystyrene, in a solvent, for example toluene, to obtain a solution 17.

In a step 120, it is optionally envisaged to carry out a neutralization of the substrate 10 of silicon oxide or silicon, via deposition of a layer 13 of RCP (Random Co-Polymer). This neutralization step 120, which is in itself known, has the purpose of controlling the wettability of the substrate with respect to the first and second polymeric phases that make up the block copolymer so as to render it homogeneous for the two blocks or phases. The RCP is formed by the same monomers as those of the block copolymer through which it is desired to obtain self-assembly of the nanostructures 14 with vertical orientation (or orientation perpendicular to the surface 10a of the substrate 10). In particular, the RCP is chemically bonded to the surface 10a of the substrate via a thermal process (grafting operation), for example keeping it for 60 s at 310° C. This step 120 has in particular the function of enabling growth of vertical nanostructures 14, i.e., ones set perpendicular to the surface 10a of the substrate 10, whereas for growths in other directions (for example, parallel to the substrate 10) it is possible to allow the substrate to have a preferential direction of wettability in regard to one of the blocks. In this regard, it is pointed out that, even though the reference-standard device described herein presents nanostructures 14 in the form of vertical cylinders or lamellae, it may, however, also use nanostructures 14 in the form of cylinders or lamellae parallel to the substrate to form the periodic pattern of the mask 16.

The substrate 10 on which step 120 (or directly the next step 130) is carried out, for example a substrate made of silicon oxide or crystalline silicon, may be previously structured, via a step 115 that envisages obtaining preliminarily structures, in particular trenches, for confinement of the solution 17 on the substrate 10, which correspond to the spatial regions 12. Hence, it is envisaged to obtain, via lithographic and chemical-etching operations, the spatial regions 12 in the form of rectangular trenches. These rectangular trenches are dug, for example, employing EBL (Electron-Beam Lithography) or EUVL (Extreme UV Lithography) and RIE (Reactive Ion Etching). These spatial regions 12 have, for example, a width W of between 80 and 600 nm and a depth t of 90 nm, and are spaced apart by a distance d of 100-400 nm. The length of the rectangular trenches 12 is in general much greater than the width W. As described more fully in what follows, in particular with reference to FIG. 8, the substrate 10 may alternatively not be structured, and hence, in this case, the solution is evenly distributed thereon, and the spatial regions 12 are formed, like grains, in particular a large rectangular planar area on which the block copolymers are self-assembled in grains having a different orientation, in the subsequent steps of the method, in particular in a following step 140 of self-assembly of the block copolymer. The substrate 10, preferably prior to step 120, undergoes a cleaning step, for example with the so-called piranha solution, to remove any possible contaminants or particulate that may be present on the substrate 10. In general, the chemical solution used depends upon the properties of the substrate.

Then, in a step 130, it is envisaged to distribute the above solution over the substrate 10 (coating of the substrate 10). The distribution may be obtained in particular via spin coating so as to obtain homogeneous thicknesses of a given value. A process intermediate is obtained, which comprises the substrate 10; in particular, it comprises spatial regions 124 dug as trenches, and the solution 17, in particular in the trenches.

This is followed by the self-assembly step 140, which envisages carrying out heating of the substrate 10, and hence of the solution 17 in the spatial regions 12, i.e., of the process intermediate obtained in step 130, above the glass-transition temperature of the solution 17, which is a temperature depending upon the molecular weight of the block copolymer used and ranging, by way of example, between 160° C. and 280° C., in order to obtain segregation in the nanometric structures 14 of the first polymeric phase in the second polymeric phase, i.e., the matrix 15.

Next, in a step 150, it is envisaged to remove either the first polymeric phase or the second polymeric phase with chemico-physical treatments, for example via UV radiation and washing in acetic acid or treatments in oxygen plasmas, to obtain a nanostructured polymeric mask 16, in particular comprising a periodic pattern of nanostructures 14, in the form of cavities or columnar structures, associated to the substrate 10, i.e., applied to its surface 10a.

As has been mentioned, the device 20 can be used maintaining the aforesaid polymeric mask 16.

However, preferably the nanostructuring process 100 further comprises a step 160 of subsequent propagation of the pattern of the polymeric mask 16 to the underlying substrate 10, by means of chemical etching that removes the polymeric mask, transferring the periodic pattern.

Therefore, in general, the solution refers also to a manufacturing method of a reference-standard device 20 for calibration of measurements of length, comprising a substrate 10 including a surface 10a having at least one calibration pattern 11, said pattern comprising a plurality of nanometric structures 14, said nanometric structures 14 having one and the same cross section in the plane of said surface and having the same nanometric dimensions, in particular less than 50 nm, said nanometric structures 14 being arranged at a distance from one another by a constant pitch of nanometric length, in particular less than 50 nm, in at least one direction, said nanometric structures 14 being arranged within spatial regions 12 delimited in one or more directions in the plane of the substrate 10, said nanometric structures 14 being obtained via application to said substrate 10 of a nanostructuring process 100 by means of a mask of block copolymers, in order to make calibrations of measurements of lengths of the order of nanometres, said nanostructuring process 100 by block copolymers comprising at least the following steps:

a) introducing 110 block copolymers comprising first polymeric phase and a second polymeric phase in a solvent, obtaining a solution 17, b) carrying out 120 the distribution of such solution over a substrate 10, in particular via spin coating, so as to obtain homogeneous thicknesses of a given value, c) carrying out 130 heating of the substrate above the glass-transition temperature of the solution 17, in order to obtain segregation of the solution in the nanometric structures 14 of the first polymeric phase 15, d) removing 140 one between the first polymeric phase and the second polymeric phase obtaining a nanostructured polymeric and periodic mask 16, associated to the substrate 10.

The nanostructuring process 100 can also propagating 150 in a subsequent instant the pattern of the polymeric mask (16) to the underlying substrate 10, by means of chemical etching that removes the polymeric mask 16, transferring the calibration pattern 11 to the substrate 10

Figure 4:
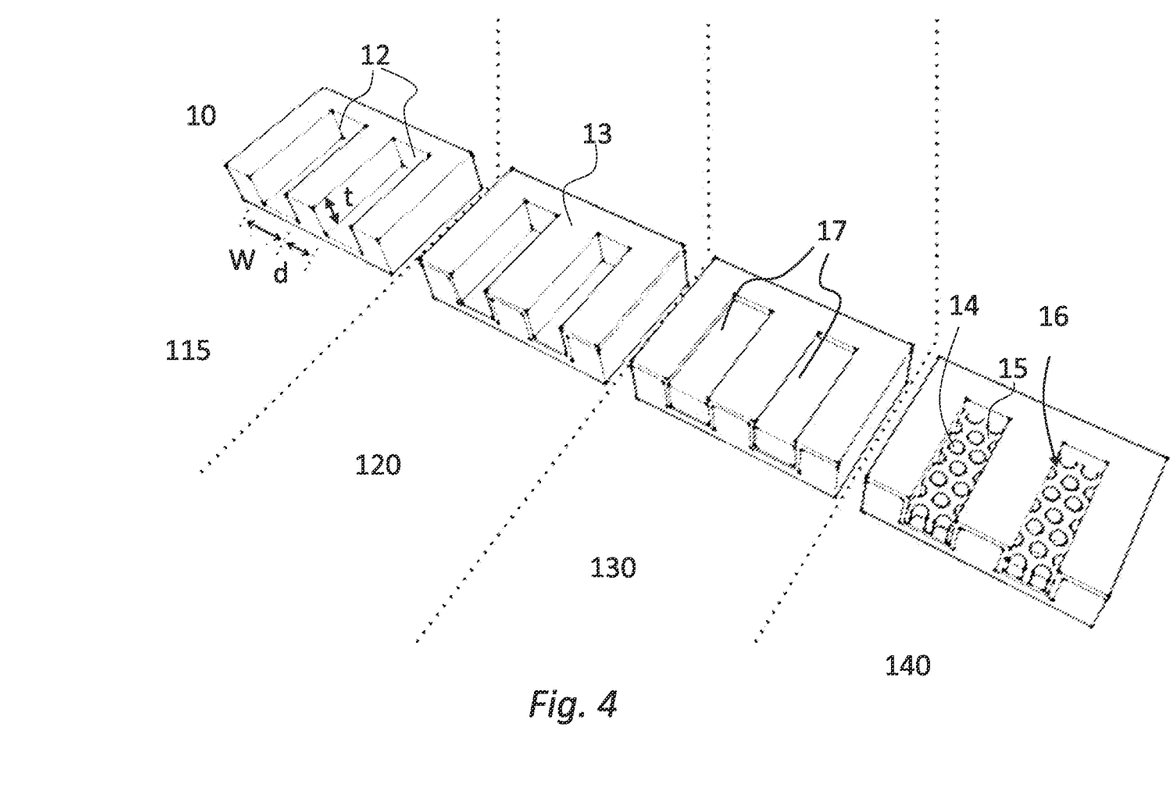
FIG. 4 shows, in perspective view, operations of the method of FIG. 3.

FIG. 4 represents schematic perspective views, sectioned in a plane along the width W, similar to those of FIG. 2, of the reference-standard device 20 following upon four of the steps of the nanostructuring method 100, respectively 115, 120, 130, and 150.

Figure 5:
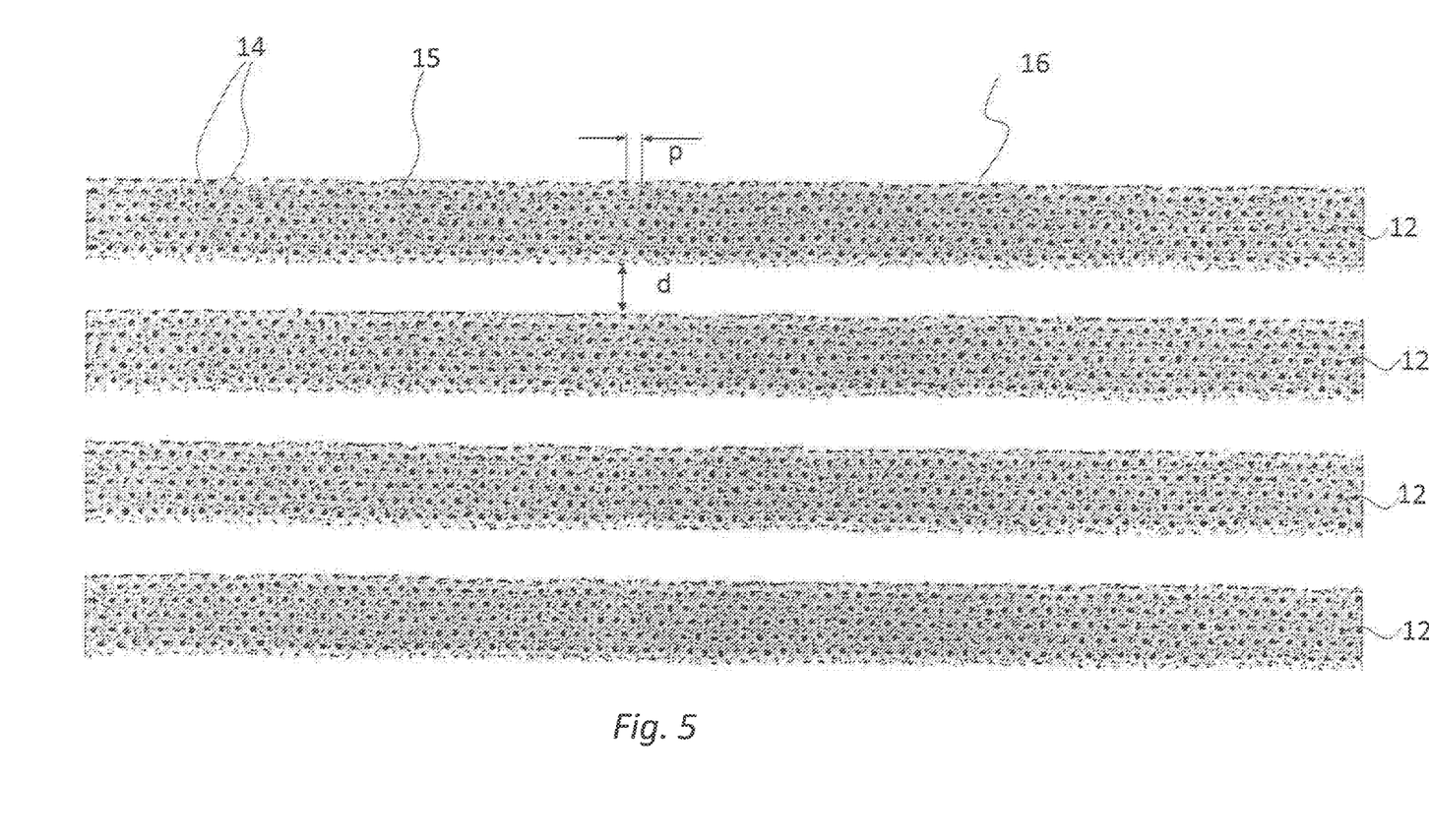
FIG. 5 is a graphic representation of a microphotograph of a detail of a reference-standard device forming the subject of the present description.

FIG. 5 is a graphic representation based upon a microphotograph of spatial regions 12, where in particular the first polymeric phase is removed, leaving circular holes 14 in the matrix 15 of a second polymeric phase. FIG. 2 corresponds to the graphic representation of a microphotograph under the scanning electron microscope of trenches 12 having a length of 100 µm dug in silicon and filled with solution 17 of block copolymers brought beyond the glass-transition temperature. The nanometric structures 14 are in the form of periodic vertical cylinders and there are no domains oriented in a different way. The periodicity, in the example illustrated, has a pitch p of 27.7±0.3 nm, measured by averaging over a distance of 400 nm, corresponding to approximately 15 periods. As has been said, the standard has a lateral extension, i.e., a length L, of 100 µm, i.e., approximately 3600 periods. This for each row include in the trenches, therefore if one has 5 rows of cylinder there are circa 3600×5 points with which is possible to operate.

It is emphasized how in general the processes of self-assembly of block copolymers, including the neutralization step, are in themselves known to the person skilled in the sector, for example from the document No. WO2014181302, and that the solution described regards the use of these processes of self-assembly of block copolymers to obtain the described nanostructures 14 according to the periodic patterns arranged within spatial regions 12 delimited in one or more directions in the plane of the substrate 10, which are used in the reference-standard device for calibration of measurements of length according to the invention.

Combination of this technique of a "bottom-up" type (in so far as it is typical of a parallel process in which the structures are formed all at the same moment within a few seconds) with traditional "top-down" lithographic techniques is called "grapho-epytaxy" or DSA (Direct Self-Assembly) and enables minimization of the defects within predefined geometric areas, i.e., the spatial regions 12, and prevention of formation of multiple differently oriented "domains" as in crystalline structures.

Use of the DSA process, in addition to enabling manufacture of structures with a periodicity of between 50 and 10 nm by simply choosing the correct molecular weight of the copolymers to be used moreover enables reduction of the uncertainty of the measurement to the level of picometres, by averaging over an extremely large number of samples, of the order of hundreds of thousands.

In the direction of the width W of the spatial regions 12, the periodicity suffers from the edge effect and may vary to enable rearrangement of more or less high number of rows of vertical cylinders. Along the length L instead, the periodicity is constant and is not affected by the edge effect, as in the case of a semi-infinite geometry.

It should be noted that the nanometric structures 14 have a characteristic dimension in the plane, for example the diameter c of the cylinders, and are arranged according to a pitch p that is determined in the nanostructuring process 100 as a function of a molecular weight Mp of the polymeric chains of the aforesaid first and second phases and of a molar fraction f of the first phase with respect to the second phase. In other words, in step 110, i.e., that of introducing block copolymers comprising a first polymeric phase and a second polymeric phase in a solvent to obtain a solution, selection of a block copolymer with a first polymeric phase and a second polymeric phase with a given molecular weight and a given molar fraction determines the diameter c and the pitch p of the nanostructures 14.

In general, a process of calibration and traceability to the nanoscale envisages use of a reference-standard device for calibration of measurements of length, like the one described with reference to the previous figures, or like the one in the variant embodiments will be described with reference to FIG. 6 (standard with calibration pattern 30, for AFM measurements), FIG. 7 (standard with calibration pattern 40, for SERS measurements), FIG. 8 (standard with calibration pattern 50, for x-ray measurements), or FIG. 9 (standard 60 with a number of calibration patterns, for different types of measurement), the calibration process basically comprising measurement of the constant pitch p of nanometric length defined in the reference-standard device between the nanometric structures 14. In a process of calibration and traceability to the nanoscale in general are then measured the geometric parameters, such as pitch and diameter, on the sample 50 for X ray measurements, and then, the obtained values are compared to those obtained by the other calibration patterns.

The calibration process may for example be a process for calibration of microscope systems of an SPM (Scanning Probe Microscope) type, such as SEM (Scanning Electron Microscope) and AFM (Atomic Force Microscope) systems.

Figure 6:
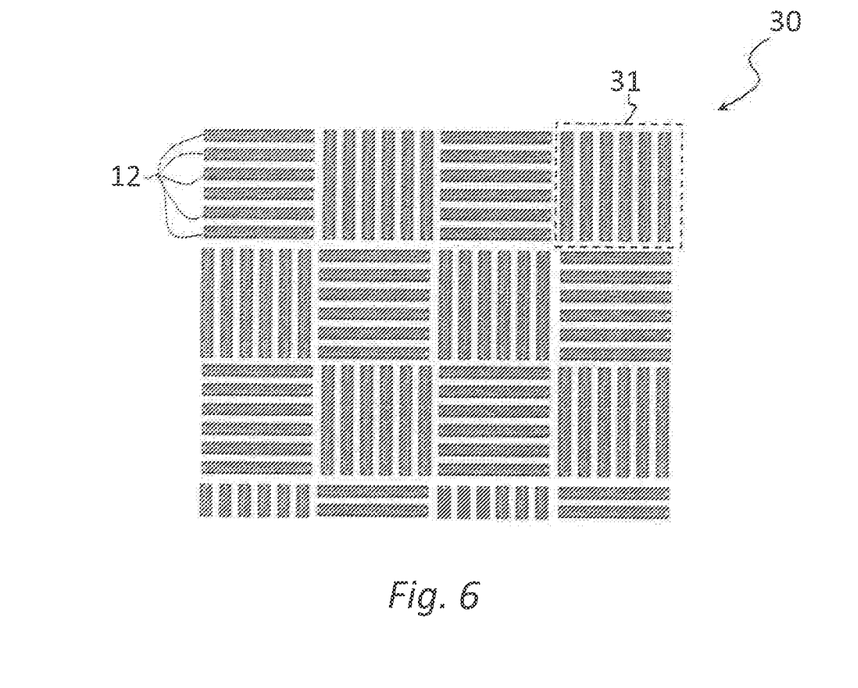
FIG. 6 illustrates a first variant embodiment of the reference-standard device forming the subject of the present description.

Illustrated in FIG. 6 is a standard device that can be used in processes for calibration of SPM systems. This standard has a calibration pattern 30 that comprises spatial regions 12 that are rectangular in shape and are arranged parallel to one another in groups. Each group forms a square area 31. The groups 31 are arranged in an array of rows and columns, in the figure an array of 4×4 groups 31, of parallel structures, each group 31 being adjacent to a group the spatial regions of which 12 are oriented perpendicular to its own spatial regions 12 or trenches. In this way, the rows of nanometric structures 14 present both in a direction X and in a direction Y that correspond to the directions of the sides of the array, which is preferably square.

It should be noted, and this in general applies to all devices that use spatial regions in the form of trenches, that as regards alignment of the angles of rotation, the sequences of reference nanostructures 14 must as far as possible be aligned with the edges of the standard. Given that the entire manufacturing process is based upon cutting of the silicon in the mutually orthogonal crystallographic directions in the plane for the silicon of orientation <100>, all the lithographic operations are carried out by alignment with the edges of the substrate, which necessarily follow the crystallographic directions.

The standard device with the pattern 30, as compared to the device 20, which may also be used for calibrations, for example, of AFM systems, presents the advantage that it has both vertical and horizontal spatial regions 12, so that, given a system that moves along the axes X and Y, it enables calibration of the system along both of said axes, without detachment, for example, of the tip of the probe of the AFM system. Furthermore, given the array or chequered arrangement with a number of groups 31 it is easy to position the tip in a point of the standard device where nanostructures are located. This enables an easy and immediate scanning of a nanostructure 14, without excessive loss in the search for the area of interest.

Each spatial region 12 in the pattern 30 may, for example, be from 1 to 10 μm in length and packed in a square layout, like that of FIG. 6, or a rectangular layout.

The size of the calibration pattern 30 may typically be 2×2 mm, positioned at the centre of a square silicon substrate having a side of 1 to 1.5 cm.

There now follows a description of an example of process for calibration of SPM systems, in particular AFM systems, along the axes X and Y of movement of the probe.

This example of process comprises, for instance, the following sequence of steps:
  checking that a high-resolution stable image is obtained of the reference-standard device for calibration of measurements of length 20 or with the pattern 30;
  setting the scanning format and the position of the SPM to the desired values (commonly, at the centre of the scan (offset x and y set at 0 V));
  setting a scanning direction that will enable recording of the image or at least recognition of the direction of alignment of a complete pattern of nanostructures 14; normally, the scanning format may be fixed at 1-2 μm to calibrate a scanner of small dimensions or for measurements in which high precision for small-scale measurements is necessary;
  setting the sampling resolution of the image on a value high enough to record faithfully the characteristics of surface structures of 30 nm of size: for example, for a 1-μm scan, setting acquisition of the image at at least 512×512 lines x pixel/line (so that each pixel is approximately 2×2 nm).
  recording just one image at the desired scanning rate;
  opening the image acquired with an image-processing application supplied by the manufacturer of the microscope or by third parties;
  processing the image for eliminating the scanning artefacts and obtaining a flat global surface topography ('planefitting' and/or 'flattening' with the correct setting of the parameters: see software instructions);
  identifying the characteristics of interest (in the example, a series of circular holes arranged in rectangular areas) in the images;
  after appropriate zooming-in, using the dedicated software tool, obtaining the topographic profile of the line of characteristics, in the known scanning direction (x or y), and verifying that the profile presents the expected surface characteristics;
  with the use of the software tools available, measuring the average distance between the centres or the edges of the nanostructures 14, corresponding to the pitch p, used as reference; if it is possible to acquire a relatively large number of nanostructures 4, it is possible to make a Fourier transform of the height profiles acquired so as to obtain a mean value;
  comparing the measured value of pitch p with the expected value, i.e., a nominal value of pitch p associated to the reference standard 20 or with the pattern 30, which is indicated, for example, in a specification sheet of the calibration standard;
  correcting the calibration parameter of the scanner of the microscope (in the scanner-parameter file or in the software utilities) according to the instructions of the manufacturer; in simpler cases, the operation performed implies linear operation of the scanner and execution of a calculation of the following type:
  (calibration parameter in the direction X of the scanner) x pitch p measured/nominal pitch; and
  repeat the operation performed (measurement of the image and correction parameter) for the other orthogonal scanning direction;
  acquiring a new image of the same characteristics with the updated scanner parameters; and
  repeating the measurements and checking the calibration precision.

Furthermore, the reference-standard device should be measured with a procedure as close as possible to the normal procedures of the microscope or of the manufacturer of the equipment.

It should hence include at least the following operations, prior to the process for calibration of AFM systems that has just been described:
  maintaining the humidity and temperature constant for all working conditions;
  maintaining the environmental conditions and conditions of configuration of the AFM system constant throughout the operations of calibration and measurement (temperature, vacuum, etc.);
  mounting and aligning to the cantilever of the AFM system a tip with a nominal radius of curvature of 2-5 nm to enable measurement of dimensions of around 30 nm;
  positioning the standard device 20, or preferably the standard device with the pattern 30, with the direction of the nanostructures 14, i.e., the direction in which the pitch p is measured, in particular the direction of the length L of the spatial region 12, oriented in the scanning direction of the microscope, i.e., the direction X or Y;
  positioning the tip at the centre of the standard device in the calibration pattern 11 or 30 and at the distance of engagement of the microscope, following normal microscope procedures; these may be automatic or manual, carried out with the naked eye or with the aid of the video camera of the microscope, if provided;
  engaging the probe of the system on the surface and obtaining an image with the AFM operating mode chosen (tapping mode); adjusting the imaging parameters (such as the feedback control or the digitization parameters—Z limit) to enable good tracking of the surface topography and good resolution in the height channel;
  setting the scanning direction at 0 degrees; in general, the format ratio of the image must be set at 1 unless the aim is to perform calibration in just one direction;

verifying the angular alignment of the characteristics of the image with the scanning direction; if the misalignment is greater than 3 degrees, it is recommended to interrupt imaging, extract the probe in a safe position, and rotate the calibration standard to correct the alignment with the scanning direction; and performing different profiles with complete scans to obtain constant and repeatable results; carrying out visual checks in order to achieve optimal image resolutions; if necessary, optimising the imaging parameters or replacing the probe.

Hence, on the basis of what has just been mentioned, the calibration process for SPM systems, in particular AFM systems, mainly envisages:

using a reference-standard device for calibration of measurements of length with a calibration pattern 11 comprising spatial regions 12 in the form of rectangular trenches;

mounting on a cantilever of the microscope system a tip having a radius such as to enable measurement of dimensions of the order of the pitch p of nanometric length;

positioning the reference-standard device in the microscope system in such a way that at least part of the nanometric structures 14 are oriented in a direction of advance of the tip or probe, in particular, in such a way that at least part of said spatial regions or trenches 12 are aligned, in particular with their own length L, i.e., the major dimension, in said direction of advance;

positioning the tip on the calibration pattern 11 and acquiring an image in one of the modes of the microscope system;

recording an image with a given sampling resolution by moving the tip in a given direction of advance aligned to said trench;

measuring, on the basis of the image recorded, an average distance between centres or edges of the nanometric structures 14 (said average distance corresponding to the pitch p) in particular by performing a Fourier transform of the height profiles acquired to obtain said average distance value;

comparing said pitch measured with a nominal pitch, i.e., the pitch p, associated to said reference device; and carrying out a calibration of the microscope system as a function of said measured pitch and nominal pitch.

It should be noted that the calibration of SPM systems may require certain steps for aligning the standard device 20 or 30 correctly.

Furthermore, the process for calibrating SPM systems may comprise, prior to recording an image with a given sampling resolution by moving the tip in a given direction of advance aligned to said trench, verifying the alignment of said spatial regions 12, in particular of the direction of the nanometric structures 14 along which the pitch p is measured, with said direction of advance of the tip.

Figure 7:
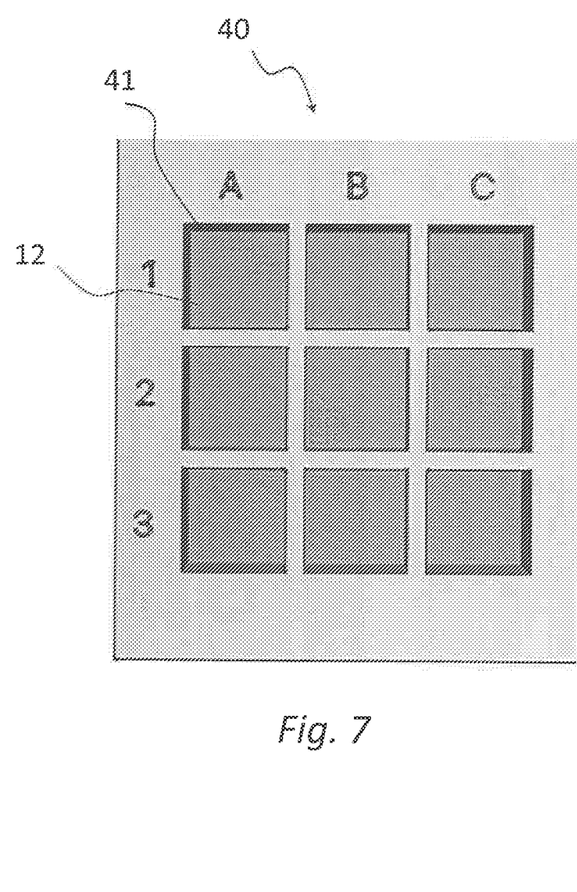
FIG. 7 illustrates a second variant embodiment of the reference-standard device forming the subject of the present description.

FIG. 7 illustrates a calibration device 40 designed for calibration of measurements of a TERS or SERS type. This device 40 comprises a calibration pattern 11 comprising a nanostructuring with squares 41 arranged in checquered or array fashion. In these squares 41, which are dug in the substrate 10, the nanostructuring process is carried out using block polymers.

The calibration process that uses the calibration device described herein may also be used for calibration of systems for measuring the size of grains of microcrystalline materials.

Figure 8:
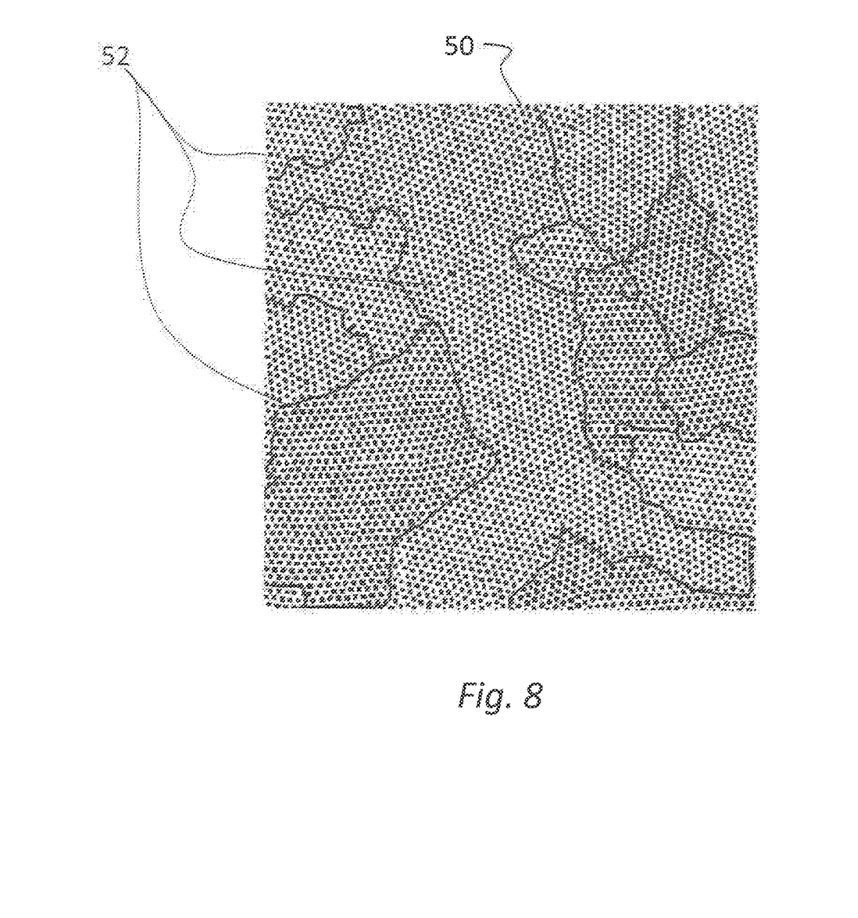
FIG. 8 illustrates a third variant embodiment of the reference-standard device forming the subject of the present description.

For this purpose, a device 60 with a calibration pattern is used, as illustrated in FIG. 8.

The above calibration method may be applied indistinctly to x-ray spectroscopy techniques, such as GISAXS, XRR, etc., or electron-microscopy techniques (SEM), or scanning-probe techniques (SPM) over a wide area.

The characteristic dimensions of block copolymers (centre-to-centre distance, and diameter) depend upon the molecular weight Mn of the polymeric chains and the percentage of one of the polymeric blocks with respect to the other, i.e., upon the molar fraction f. When block copolymers are arranged on a plane standard without any geometrical constraint, i.e., no grapho-epitaxial processes are carried out, they self-assemble to form grains 62 oriented along different directional axes, the average size of which is a function of the particular thermal process used for inducing phase separation. This size may range indicatively from 40 nm to a few microns, according to the type of copolymer used and the heating parameters. By adopting RTP (Rapid Thermal Processing) heating it is possible to produce in a highly reproducible way standards one and the same average grain size. The calibration pattern thus formed may then be transferred onto the substrate 10 made of Si or $SiO_2$ in such a way as to create a more stable and less deterioratable matrix as compared to the polymeric one. The size of the grains may be derived in a known way by calculating the order correlation function, using image-analysis software (ImageJ, Matlab functions, SPIP, etc.).

In order to determine the average grain size and the exact characteristic dimensions of the self-assembled standard on a large scale, the standard must be analysed using, for example, the GISAXS technique carried out with detectors calibrated and referenced to the metre at a metrological synchrotron (PTB Bessy).

Once the above operation has been performed, the standard 50 can be used for aligning the x-ray spectroscopy spectra obtained in other beam-lines.

Hence, the calibration process in this case involves using the device 6' comprising spatial regions 12 in the form of grains 52, then measuring the device 50 via an x-ray diffractometry system, in particular GISAXS, performed with detectors calibrated and referenced to the metre to obtain a corresponding measured spectrum, and calibrating the x-ray diffractometry system by aligning said measured spectrum to a reference spectrum associated to said reference device.

Figure 9:
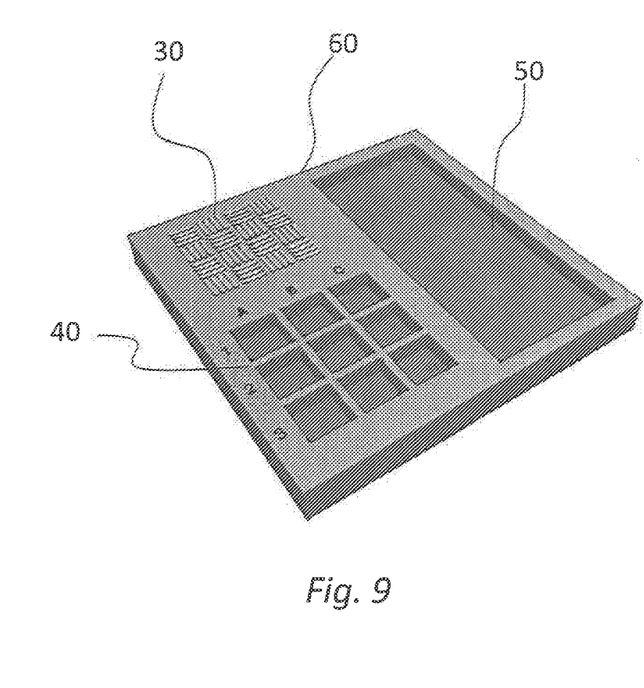
FIG. 9 illustrates a fourth variant embodiment of the reference-standard device forming the subject of the present description.

Finally, illustrated in FIG. 9 is a calibration device 60 comprising a support, which in the example is the substrate 10, including a calibration pattern, which is divided into a plurality of calibration areas and comprises at least one area with the pattern 30 of FIG. 6, including groups 31 of trenches parallel to one another and orthogonal to those of the adjacent groups, for SPM measurements, one area 50 including a plurality of grains 52, for measurements on microcrystalline materials, and, additionally, one area 40 including a nanostructuring with squares 41 arranged in checquered fashion for SERS measurements.

In variant embodiments the calibration device 60 can include a different number of calibration patterns, for instance two patterns, which however include the area 50 comprising a plurality of grains 52, which can be measured with the X ray diffractometry system, in particular GISAXS, performed with the calibrated detector traceable to the meter, obtaining a corresponding measure. This allows then carrying out the measurement traceability chain with respect to the length unit of the Internationa System (the meter), since the measurements on the other patterns 30 e/o 40 can be compared with such measurements on the pattern 50 traceable to the meter.

Hence, from the foregoing description the advantages of the technique described herein emerge clearly.

The solution described present a significant reduction in the uncertainty value of the quantity to be measured (up to values equal to or less than 0.02 nm or, in other words, uncertainty of less than 1.3%). This possibility is due to the fact that is possible to obtain in parallel a great number of regular structures, in particular cylindrical, for example greater in number than $10^3$, having the characteristic dimensions. This allows to considerably increase the number of values acquired in a single measurement, lowering the uncertainty as a result.

The solution described above also allows the measurement of the measurement traceability chain with respect to the length unit of the International System (meter). The possibility of having on the same device for measuring structures on a large area and structures confined within regular trenches allows direct comparison of the measurement of the characteristic BCP period made by x-ray diffractometry (BESSY II line of PTB) related to the current definition Of meter by means of a clear chain of traceability, like the one achieved by SPM or SEM.

The solution described above also allows non-linear second-order corrections to calibrate SPM tools that work on a nanometer scale. Contrary to what happens with other manufacturing methods, the self-assembling process of block copolymers allows to create a regular nanostructured pattern on a large area (at least 1 $cm^2$). This allows to calibrate the movement of the piezoelectric stages of which the SPMs are normally equipped, throughout their length travel.

Of course, without prejudice to the principle of the invention, the details and the embodiments may vary, even considerably, with respect to what is described herein purely by way of example, without thereby departing from the sphere of protection, which is defined in the annexed claims. The block copolymer may be selected from a group comprising: polystyrene-polyfluorostyrene (PS-PFS), polystyrene-poly(dimethyl siloxane) (PS-PDMS), polystyrene-poly (ethylene oxide) (PS-PEO), polystyrene-poly (methylstyrene) (PS-PMS), polystyrene-poly(4-vinylpyridine) (PS-P4VP), polystyrene-poly(2-vinylpyridine) (PS-P2VP), polystyrene-polylactide (PS-PLA), polystyrene-polyamide PS-PI), polystyrene-poly (ethylene-propylene) (PS-PEP), polyamide-poly(4-vinylpyridine) (PI-P4VP), polyimide-poly(2-vinylpyridine) (PI-P2VP), polystyrene-poly(acrylic acid) (PS-PAA), polystyrene-poly(butadiene) (PS-PBD), polystyrene-poly(vinylpyridine) (PS-PVP), poly(ethylene-propylene)-poly (ethylethylene) (PEP-PEE), poly(ethylene oxide)-polystyrene (PEO-PS), copolymers based upon poly(meth) acrylate, polydiene, polyisobutylene, polystyrene, polyvinyl naphthalene, polyvinyl pyridine, polypropylene oxide, polysiloxane, adipic anhydride, polyolefins, polylactide, polyferrocenyl dimethylsilane, polyhedral oligomeric silsesquioxane.

The solvent may be selected from a group that includes: toluene, acetone, tetrahydrofuran, chloroform, dichloromethane, benzene, methyl ethyl ketone (MEK), chlorobenzene, xylene, cyclohexanone, and formic acid.

The substrate may be selected from a group comprising: silicon oxide, silicon, zinc oxide, permalloy, ITO, high-permittivity oxides, oxides of transition metals, oxides of rare earths, oxides of transition metals, and aluminium oxide.

The invention claimed is:

1. A reference-standard device for calibration of measurements of length, comprising a substrate including a surface having at least one calibration pattern, wherein said pattern comprises a plurality of nanometric structures, said nanometric structures having one and the same cross section in the plane of said surface and having the same nanometric dimensions, in particular less than 50 nm, said nanometric structures being arranged at a distance from one another by a constant pitch of nanometric length, in particular less than 50 nm, in at least one direction, said nanometric structures being arranged within spatial regions delimited in one or more directions in the plane of the substrate, said nanometric structures being obtained via application to said substrate of a nanostructuring process by means of a mask of block copolymers, in order to make calibrations of measurements of lengths of the order of nanometres, said nanometric structures being cavities in a matrix or columnar structures with a circular cross section.

2. The reference-standard device according to claim 1, wherein said spatial regions correspond to shapes of trenches dug in the substrate, in particular rectangular, or to grains, in particular grains obtained self-assemblying in a wide planar rectangular area the block copolymers in grains having different orientation.

3. The reference-standard device according to claim 1, wherein said nanometric structures belong to the substrate or to the mask and comprise cavities and/or reliefs of the mask or of the substrate.

4. The reference-standard device according to claim 1, wherein said nanometric structures are aligned to the edges of the standard device, in particular in the crystallographic directions of the substrate.

5. The reference-standard device according to claim 1, wherein said spatial regions are rectangular in shape and arranged parallel in groups, each group being adjacent to a group the spatial regions of which are oriented perpendicular to its own spatial regions.

6. The reference-standard device according to claim 1, wherein said nanostructuring process by means of block copolymers comprises at least the following steps:
  a) introducing block copolymers comprising a first polymeric phase and a second polymeric phase in a solvent to obtain a solution;
  b) distributing said solution over a substrate, in particular via spin coating so as to obtain homogeneousus thicknesses and of a given value,
  c) heating the substrate above the glass-transition temperature of the solution in order to obtain segregation of the solution in said nanometric structures of the first polymeric phase into the second polymeric phase; and
  d) removing either the first polymeric phase or the second polymeric phase to obtain a nanostructured and periodic polymeric mask associated to the substrate,
  in particular said nanostructuring process further comprising:
  e) subsequently propagating the pattern of said polymeric mask on the underlying substrate by means of chemical etching that removes the polymeric mask, transferring the periodic calibration pattern to the substrate, in particular said propagating step comprising a step of obtaining preliminarily confinement structures of the solution on the substrate, which correspond to said spatial regions.

7. The device according to claim 6, wherein said spatial regions are grains obtained via the step of providing a polymeric mask comprising a calibration pattern including spatial regions in the form of grains, which in particular comprises a step of obtaining preliminarily confinement structures of the solution on the substrate, which correspond to said spatial regions.

8. The device according to claim 1, wherein it comprises a support, in particular said substrate, including a calibration pattern, which is divided into a plurality of calibration areas and comprises at least one area including trenches, one area including a plurality of grains, and, additionally, one area including a nanostructuring with squares arranged in checquered fashion, said squares comprising trenches or grains.

9. The device according to claim 1, wherein said nanometric structures have a characteristic dimension (c) in the plane and are arranged according to a pitch (p) determined as a function of a molecular weight (Mp) of the polymeric chains of said first and second phases and of a molar fraction (f) between said first phase and said second phase.

10. A calibration process, wherein it comprises measurement of said constant pitch (p) of nanometric length between said nanometric structures of said device according to claim 1, in particular for calibrating SPM (Scanning Probe Microscope) systems, such as SEM (Scanning Electron Microscope) and AFM (Atomic Force Microscope) systems.

11. The calibration process according to claim 10, wherein it comprises:
using a device with a calibration pattern comprising spatial regions (12) in the form of rectangular trenches;
mounting on a cantilever of the microscope system a tip having a radius such as to enable measurement of dimensions of the order of said pitch of nanometric length;
positioning said reference-standard device in the microscope system with at least part of said nanometric structures oriented in a direction of advance of said tip, in particular at least part of said spatial regions or trenches being aligned in said direction of advance;
positioning said tip on said calibration pattern and acquiring an image in one of the modes of the microscope system;
recording an image with a given sampling resolution by moving the tip in a given direction of advance aligned to said trench, in particular comprising, prior to said recording an image with a given sampling resolution by moving the tip in a given direction of advance aligned to said trench, verifying the alignment of said trenches to said direction of advance of the tip;
measuring, on the basis of said recorded image, an average distance between centres or edges of said nanometric structures, said average distance corresponding to said pitch, in particular by performing a Fourier transform of the profiles of height acquired to obtain said average distance value;
comparing said pitch measured with a nominal pitch associated to said reference device; and
making a calibration of the microscope system as a function of said measured pitch and nominal pitch.

12. The calibration process according to claim 10, wherein it is a calibration procedure of a TERS (Tip-Enhanced Raman Spectroscopy) or SERS (Surface-Enhanced Raman Spectroscopy) type and comprises using a reference device including an area that comprises a nanostructuring with squares arranged in checquered fashion, said squares including trenches or grains.

13. The calibration process according to claim 10, wherein it is a process for calibrating systems for measuring the size of grains of microcrystalline materials, in particular by
using said device that comprises spatial regions in the form of grains;
measuring the device via x-ray diffractometry system, in particular GISAXS (Grating-Incidence Small-Angle X-ray Scattering), performed with detectors calibrated and referenced to the metre to obtain a corresponding measured spectrum; and
calibrating the x-ray diffractometry system by aligning said measured spectrum to a reference spectrum associated to said reference device.

14. The calibration process according to claim 13, wherein it includes using said calibration pattern subdivided in a plurality of calibration areas, measuring said area (50) comprising a plurality of grains, by X ray diffractometry, in particular GISAXS, performed with the calibrated detector traceable to the meter, obtaining a corresponding measure, comparing the measurements on the other calibration areas with such measurements performed on the pattern traceable to the meter.

15. Manufacturing method of a reference-standard device for calibration of measurements of length, comprising a substrate including a surface having at least one calibration pattern,
said pattern comprising a plurality of nanometric structures, said nanometric structures having one and the same cross section in the plane of said surface and having the same nanometric dimensions, in particular less than 50 nm, said nanometric structures being arranged at a distance from one another by a constant pitch of nanometric length, in particular less than 50 nm, in at least one direction, said nanometric structures being arranged within spatial regions delimited in one or more directions in the plane of the substrate, in particular arranging said nanostructures, having a characteristic dimension (c) in the plane, according to a pitch (p) that is determined as a function of a molecular weight (Mp) of the polymeric chains of a said first and second phases and of a molar fraction (f) of the first phase with respect to the second phase, said nanometric structures being obtained via application to said substrate of a nanostructuring process by means of a mask of block copolymers, in order to make calibrations of measurements of lengths of the order of nanometres, said nanostructuring process by block copolymers comprising at least the following steps:
a) introducing block copolymers comprising first polymeric phase and a second polymeric phase in a solvent, obtaining a solution,
b) carrying out the distribution of such solution over a substrate, in particular via spin coating, so as to obtain homogeneous thicknesses of a given value,
c) carrying out heating of the substrate above the glass-transition temperature of the solution, in order to obtain segregation of the solution in the nanometric structures of the first polymeric phase,
d) removing one between the first polymeric phase and the second polymeric phase obtaining a nanostructured polymeric and periodic mask, associated to the substrate,
in particular said nanostructuring process further comprising
e) propagating in a subsequent instant the pattern of the polymeric mask to the underlying substrate, by means of chemical etching that removes the polymeric mask, transferring the calibration pattern to the substrate.

* * * * *